Patented Dec. 2, 1930

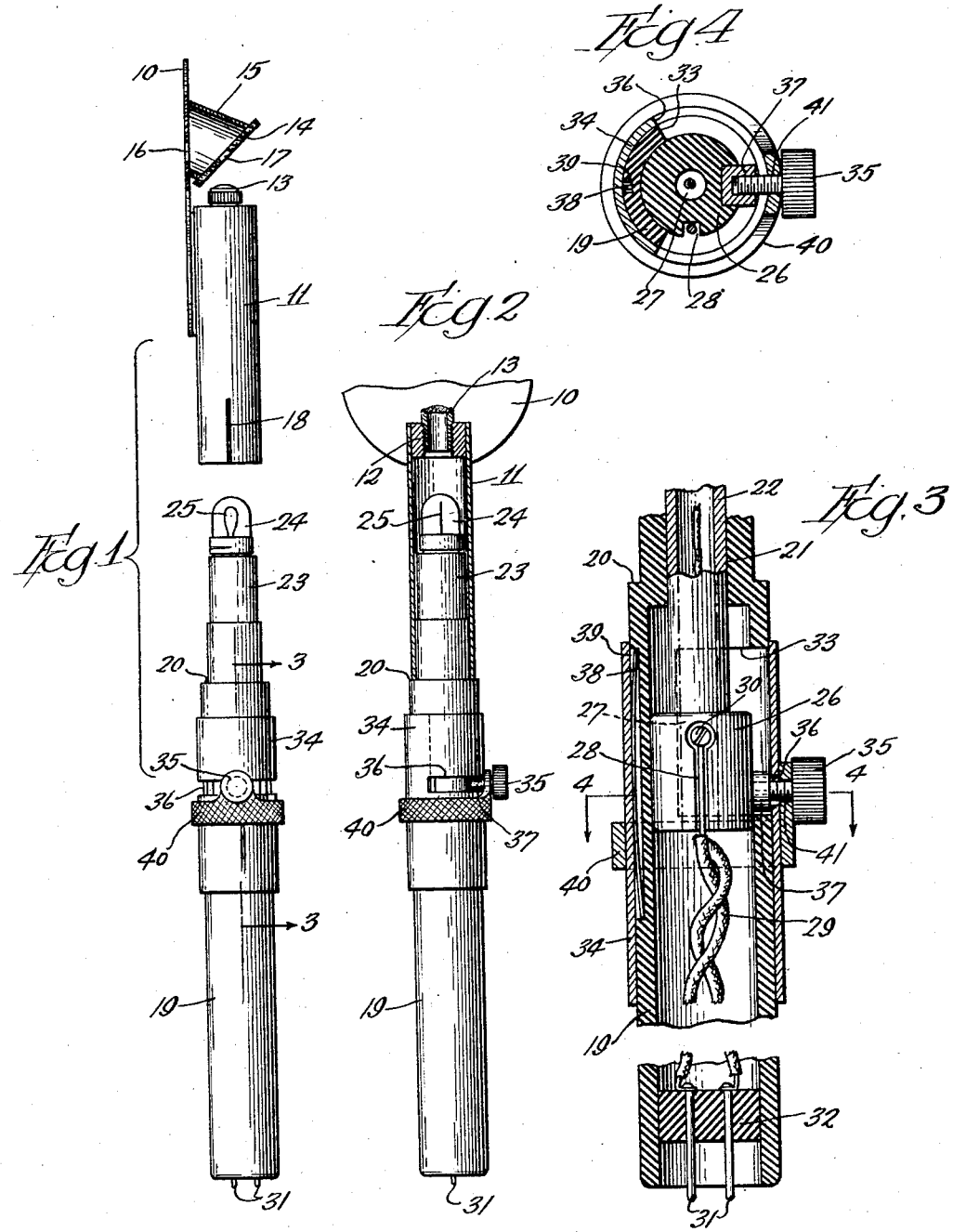

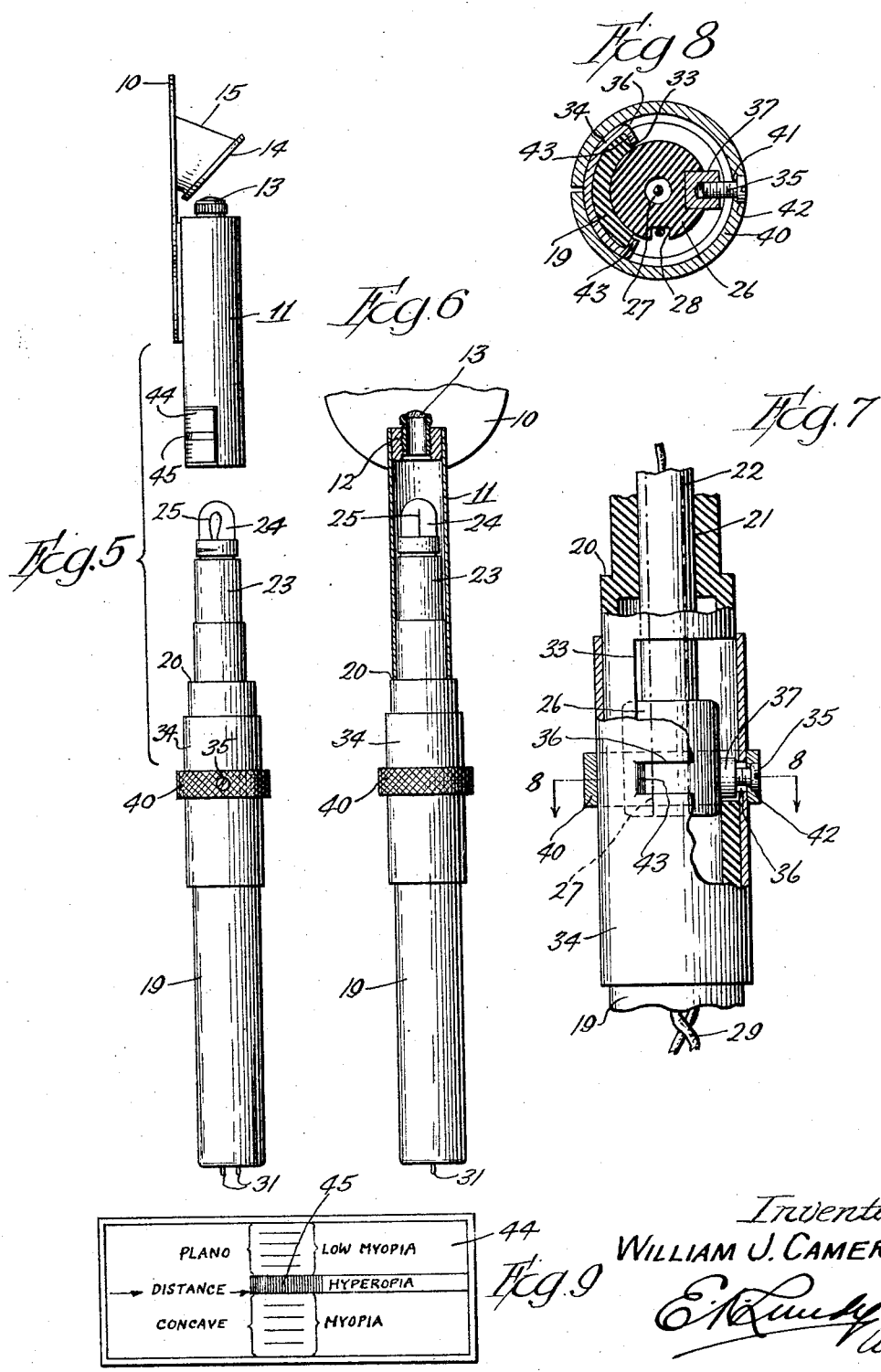

1,783,461

UNITED STATES PATENT OFFICE

WILLIAM J. CAMERON, OF CHICAGO, ILLINOIS

OPTICAL INSTRUMENT

Application filed December 28, 1927. Serial No. 243,162.

My present invention relates to a handle structure used in coaction with an optical instrument for making optical examinations, inspections and diagnosis. More particularly my present invention has reference to a handle that may be removably secured to a retinoscope or similar optical instrument, so that the operator may readily examine tissues remote to ordinary observation. The construction of this handle and optical instrument is such that the tissue under investigation will be illuminated by the rays from a miniature bulb or lamp, which rays are magnified through a lenticular element and focused upon the part under inspection in the form of a streak or line of light.

The primary object of my invention resides in the provision of a handle wherein is carried the miniature bulb or lamp in a socket element and which is adapted to be rotated upon its axis and may be bodily moved longitudinally by means of a control element that is operable from the exterior of the handle, so as to focus the lamp filament through the lens. Another object of my invention resides in providing a handle structure that may be readily attached to or detached from the optical instrument and which effectively coacts therewith so as to illuminate the area under observation in the manner desired. In a retinoscope, it is desirable to provide an illumination, when inspecting the retina of the eye, which is in the form of a narrow line or transversely condensed beam of light. With my improved structure I am able to rotate the bulb or lamp until the single incandescent filament thereof is properly disposed with relation to the magnifying lens and the projecting reflector of the retinoscope, and I am also able to move the bulb longitudinally towards and away from the lens, until the desired character of illumination is obtained, which is the focusing and magnification of the single filament upon the retina or fundus. By rotating the bulb the ribbon of light or "stria" may be projected into the eye the exact location of the optical axis is readily determined by the operator. With the present structure the distance from the lamp to the lens may be varied at will, and the lamp may be rotated at any position to which it may have been adjusted, and all of these adjustments may be readily made by the operator with the use of the fingers and thumb of one hand thus leaving the other hand free for other purposes. By reading indicia upon a scale or chart on the instrument when the sliding element is in different positions I have provided a very simple method of determining, to a very close approximation, the amount refractive error of the eye under examination, and ascertain at once whether high and low myopic, or hyperopic conditions exist. Further objects of my invention reside in providing a structure of the above character that is extremely compact in the construction and arrangement of its parts; which is dependable in operation; has a wide range of adjustability; and is novel and sturdy in construction.

I prefer to carry out my invention and to accomplish the aforesaid objects in substantially the manner hereinafter more fully described and as more particularly pointed out in the claims, reference being herein made to the accompanying drawings that form a part of this specification.

In the drawings:

Figure 1 is a vertical side elevation of my improved retinoscope head and handle showing the latter about to be inserted in the former.

Figure 2 is a rear view of the structure illustrated in Figure 1, but in assembled form and having a portion of the handle and retinoscope socket in section.

Figure 3 is a longitudinal axial section on line 3—3, Figure 1 of a fragmentary portion of the structure drawn slightly enlarged.

Figure 4 is an enlarged transverse section taken on line 4—4 of Figure 3, looking in the direction of the arrows.

Figure 5 is a view similar to Figure 1 showing a slightly modified type of structure.

Figure 6 is a view showing the parts in assembly, with the retinoscope socket member in longitudinal section.

Figure 7 is a fragmentary view partly broken away to disclose the details of the modified type.

Figure 8 is a transverse section taken on line 8—8 of Figure 7 looking in the direction of the arrows.

Figure 9 is an enlarged view of the scale or chart in a flattened condition.

In the drawings I have employed the same reference characters to designate like parts wherever they appear throughout the several views, and by referring to Figures 1, 2, 5 and 6, it will be seen I employ a handle that may be removably assembled with an instrument for making optical examinations, and in the present instance I have illustrated the structure in connection with a simple form or retinoscope for the purpose of simplicity. The retinoscope head is schematically designed by the disk-like structure indicated by the numeral 10 and has upon the rear face a radially disposed elongated tubular element or socket 11, the upper end of which latter is closed by a bushing or plug 12, into which the hollow lenticular element 13 is screwed so as to be in axial alinement with an angular disposed reflector element or mirror on the back of the disk 10. In order to mount the reflector or mirror the same is secured to an end of a tube 15 that projects obliquely from the back of disk 10. There is a viewing aperture 16 in the disk and a similar alining aperture or window indicated schematically at 17 on the mirror. The lower end of the socket 11 is provided with a slit 18 extending longitudinally inwardly from the edge thereof so as to permit a spring or friction action when the end of the handle member is inserted in said socket.

The handle preferably comprises a barrel 19 that is of tubular form in cross-section, that is preferably elongated, and the upper portion of which is slightly reduced in diameter to provide a stop or shoulder 20 against which the lower edge of the socket 11 abuts when the handle is inserted in the latter. This barrel is formed of hard rubber, bakelite or similar insulating substance. The bore at the shouldered end of the barrel is also slightly reduced as at 21 to provide a bearing in which a hollow stem 22 is mounted to slide longitudinally therein, and the outer end of the same, which projects outside the barrel 19, is provided with an enlargement or head 23 that is of less diameter than the interior diameter of the socket 11 of the retinoscope so that it will not interfere with or contact the same. This head or enlargement 23 is hollow and internally threaded to provide an electrical socket connector into which is screwed a miniature lamp or bulb 24 having a single looped filament 25. The opposite end of the hollow stem 22 is provided with a head in the form of an insulating block 26. This head or insulating block 26 is provided with a central bore 27 alining with the bore of tubular spindle 22, and there is a longitudinal groove or channel 28 formed upon the edge of said block 26, so that the ends of the electrical conductors 29, may be positioned in the bores and the groove. One of the conductors, (that lying in the groove 28) is electrically connected by a screw 20 to the adjacent end of the stem 22, while the other, (that passing through the bores) extends through the stem and is connected to the terminal in the base of the electric socket in which the lamp or bulb 24 is positioned. The conductors extend downwardly to the opposite end of the barrel where their ends are connected to terminals or posts 31 that are spaced apart parallel with each other and pass through an insulation block 32 in the adjacent end portion of the barrel, and said terminals or posts 31 are of sufficient length to project beyond the end of the barrel, so that when the electrical connection is made the miniature plug having cylindrical terminals may be inserted into the end of the barrel with the terminals telescoping the posts or pins 31 in the well-known manner.

The barrel adjacent the inner end of the spindle 22 is provided with a lateral aperture 33 that is preferably of such diameter as to permit of the connection of the spindle with exteriorly disposed means for operating the same, so that said spindle may be rotated and moved longitudinally whenever desired. In this manner I have provided means for varying the distance between the lamp and the lens to obtain any desired focus and means for rotating the lamp in any of its various positions so that the projected line or streak of light may be positioned at the various angles from the vertical to the horizontal. This is accomplished by substantially the following structure:—Surrounding the barrel 19 at the location of the aperture 33 is an elongated sleeve or slide 34 that frictionally engages the outer surface of the barrel 19 and which is connected to the spindle 22 by means of a screw 35 that passes through an annular transverse slot 36 in said sleeve and is screwed into the threaded bore of a hollow stud 37 projecting laterally from the adjacent side of the insulating block or head 26 at the lower end of the spindle. The stud 37 projects into the aperture 33 of the barrel and thus limits the longitudinal and rotational movements of the spindle 22. In order to increase the frictional engagement of the sleeve with the barrel an outwardly bowed arcuate spring 38 is positioned in an elongated groove 39 extending longitudinally on the barrel so that the spring bears against the interior surface of the sleeve and creates sufficient friction to maintain the parts in any adjustable position. The means for rotating the spindle 22 and the lamp consists of a ring 40 that surrounds the sleeve 34 at or adjacent the slot 36 and the screw 35 passes through an unthreaded aperture 41 in the ring prior to entering the slot 36 and stud 37 so as to connect the ring to the spindle for rotational movement of the lamp. It will be seen that the stud 37 is of greater diameter than the width of slot 36 in the sleeve, so that when the screw is provided with an enlarged head (Figs. 1 to 4) the latter may be turned to draw the parts together. This will clamp the end of the stud against the inner surface of the sleeve and also press the adjacent faces of the ring and sleeve together so that it becomes difficult to move one of them independently of the other thus frictionally securing the structure in any adjusted position. In the construction shown in Figs. 5 to 8 the ring 40 is positioned to obscure the slot and the screw head is flush with the surface of the ring because it is fitted into a shouldered aperture 42 so that the parts may not be frictionally clamped together as in the previously described type. For the purpose of limiting the sleeve 34 in the last described type to an up and down movement, inwardly bent lugs 43 are formed at the ends of the slot 36 which lugs engage the portions of the barrel 19 at the longitudinal edges of the aperture 33 as shown in Fig. 8 and thus prevent rotational movement of the sleeve.

Upon the lower portion of the tubular element or socket 11 of the retinoscope I etch or engrave a scale or chart 44 that encircles the same at a point where the upper edge of the sleeve 34 may coact therewith, which chart is shown in detail and enlarged in Figure 9 of the drawings. There is a central band 45 on the chart that is colored red so as to be readily discernible to the operator to indicate the hyperopia zone, while above and below this band are the myopia areas of which the upper is the lower myopia area. In use the instrument is positioned approximately twenty-six (26) inches from the patient's eye and the sleeve is moved upwardly until the operator observes the fundus through the eye lens which will be of course the point at which the light is perfectly focused on the fundus. A glance at the chart will indicate that the upper edge of the sleeve is positioned in one of the three areas and the optical condition may thereby be noted.

From the foregoing it will be seen that the tubular element of the examination may be mounted upon the handle, and, when the sleeve 34 is moved longitudinally upon the barrel, the lamp or bulb will be moved longitudinally within the tubular element 11 so as to adjust the filament of the lamp with respect to the lenticular closure 13 and this adjustment may be longitudinally toward or away from the lens so as to focus the lamp through the lens. In any position of adjustment the lamp may be moved in a rotary direction by means of the ring so that the single filament of the bulb will be properly positioned to direct the flat beam or streak of light through the lens, which will direct it to the reflector or mirror 14 and from thence upon the retina of the eye.

What I claim is:

1. A device of the kind described comprising a suitable instrument having a tubular member thereon, a lens at one end of said tube, a hollow barrel coacting with the opposite open end of said tube, a stem reciprocable longitudinally in said barrel, a lamp on the end of said stem nearest said lens, means exterior to said structure for moving the stem longitudinally to vary the distance between the lamp and lens, and other means movable independently of the first means for rotating said lamp.

2. A device of the kind described comprising a suitable instrument having a tubular member thereon, a lens at one end of said tube, a hollow barrel coacting with the opposite open end of said tube, a stem reciprocable longitudinally in said barrel, a lamp on the end of said stem nearest said lens, means for moving the stem longitudinally to vary the distance between the lamp and lens, and means mounted on the first-mentioned means and movable independently thereof for rotating said lamp.

3. A device of the kind described comprising a suitable instrument having a tubular member thereon, a lens at one end of said tube, a hollow barrel coacting with the opposite open end of said tube, a stem reciprocable longitudinally in said barrel, a lamp on the end of said stem nearest said lens, a sleeve movable upon the exterior of said barrel and operatively connected to said stem for moving the latter longitudinally to vary the distance between the lamp and lens, and means transversely movable upon the sleeve and operatively connected to said stem for rotating said lamp.

4. A device of the kind described comprising a suitable instrument having a tubular member thereon, a lens at one end of said tube, a hollow barrel coacting with the opposite open end of said tube, a stem reciprocable longitudinally in said barrel, a lamp on the end of said stem nearest said lens, a sleeve movable upon the exterior of said barrel, a ring movable transversely upon said sleeve, and means common to said sleeve and ring operatively connecting the same to said stem, whereby the distance between said lens and lamp may be varied by a longitudinal movement of the sleeve on the barrel and said lamp may be rotated by a transverse movement of the ring upon the sleeve.

5. A retinoscope comprising a member having a sight aperture, a mirror co-ordinated with said aperture, a lens cooperative with said mirror, a lamp projecting light rays through said lens, means for varying the distance between said lens and lamp, and other means movable independently of the first means for readily rotating said lamp while in use.

6. A retinoscope comprising a member having a sight aperture, a mirror co-ordinated with said aperture, a tubular structure axially alined with said mirror, a lens in said tubular structure and projecting light rays upon said mirror, a lamp in said tubular structure and alined with said lens, means operable from the exterior of the tubular structure for varying the distance between the lens and lamp, and other means for readily rotating said lamp while in use.

7. A retinoscope comprising a member having a sight aperture, a mirror co-ordinated with said aperture, a tubular structure axially alined with said mirror, a lens in said tubular structure and projecting light rays upon said mirror, a lamp in said tubular structure and alined with said lens, a sleeve reciprocable longitudinally upon said tubular structure and connected to the lamp for varying the distance between the same and said lens, and means rotatable on the sleeve and having operative connection with the lamp for rotating the latter.

8. A retinoscope comprising a member having a sight aperture, a mirror co-ordinated with said aperture, a lens cooperative with said mirror, a lamp projecting light rays through said lens, a stem on which said lamp is mounted, means for movably mounting said stem, a sleeve reciprocable on said means and operatively connected to said stem for moving the lamp towards and away from the lens, and a ring rotatable on the sleeve and operatively connected to said stem for rotating the lamp.

9. An optical device comprising a suitable instrument, a lamp projecting light rays from said instrument, a lens through which the light rays pass prior to leaving the instrument, means for moving the lamp toward and away from the lens, means for viewing the object illuminated by said lamp, and a chart having graduations on said instrument over which a portion of said lamp moving means is moved during adjustment to indicate an optical error in the patient's eye.

10. An optical device comprising a suitable instrument having a tubular member, a lamp projecting light rays through said tubular member into the eye of the patient, a lens through which the light rays pass, means for viewing the illuminated portion of the eye, means for moving the lamp toward and away from the lens, and a chart having graduations on said tubular member in coactive relation with an edge of said lamp moving means to indicate an optical error in the patient's eye.

11. An optical device comprising a suitable instrument having a tubular member, a lamp projecting light rays through said tubular member into the eye of the patient, a lens through which the light rays pass, means for viewing the illuminated portion of the eye, a barrel in which the lamp is movably disposed, a slide on said barrel and connected to said lamp for moving the latter towards and away from the lens, and a chart having graduations on said tubular member with which an edge of the slide coacts to indicate an optical error in the patient's eye.

12. A retinoscope comprising a member having a sight aperture, a mirror co-ordinated with said aperture, a tubular structure axially alined with said mirror, a lens in said tubular structure and projecting light rays upon said mirror, a lamp rotatably mounted in said tubular structure and alined with said lens, means operable from the exterior of the tubular structure for varying the distance between the lens and lamp, and other means movable independently of the first means for rotating said lamp while maintaining the distance between said lens and lamp constant.

Signed at Chicago, in the county of Cook, and State of Illinois, this 6th day of December, 1927.

WILLIAM J. CAMERON.